United States Patent [19]
O'Neill et al.

[11] Patent Number: 5,218,664
[45] Date of Patent: Jun. 8, 1993

[54] SPLICE CLOSURE WITH LIFTING HANDLES

[75] Inventors: Andrew J. O'Neill, Hickory, N.C.; John D. Harvey, North Richland Hills, Tex.; James R. Merriken, Hudson, N.C.

[73] Assignee: Siecor Corporation, Hickory, N.C.

[21] Appl. No.: 888,068

[22] Filed: May 26, 1992

[51] Int. Cl.5 .............................................. G02B 6/36
[52] U.S. Cl. .................................... 385/135; 385/137
[58] Field of Search ................. 385/134, 135, 136, 137

[56] References Cited

U.S. PATENT DOCUMENTS

| | | | |
|---|---|---|---|
| 4,666,240 | 5/1987 | Caron et al. | 385/135 |
| 4,685,764 | 8/1987 | Hoffer et al. | 385/135 |
| 4,799,757 | 1/1989 | Goetter | 385/135 |
| 5,007,701 | 4/1991 | Roberts | 385/135 |
| 5,097,529 | 3/1992 | Cobb et al. | 385/135 |
| 5,155,794 | 10/1992 | Nolf et al. | 385/135 |

OTHER PUBLICATIONS

Siecor Recommended Procedure SRP 003-255 (Jan. 1991).
AT&T Practice Instruction sheet 633-502-101-9, 10 (1988).

Primary Examiner—John D. Lee
Assistant Examiner—Phan T. Heartney
Attorney, Agent, or Firm—J. David Abernethy

[57] ABSTRACT

Disclosed is a light waveguide splice closure having lifting handles for removing the closure end cap. The closure contains an open top vessel for holding water-blocking material.

5 Claims, 4 Drawing Sheets

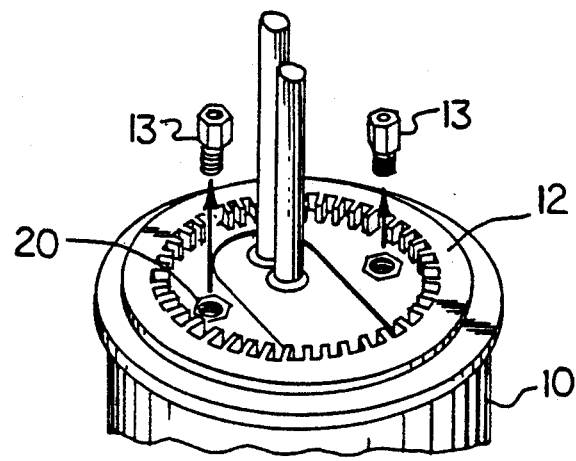
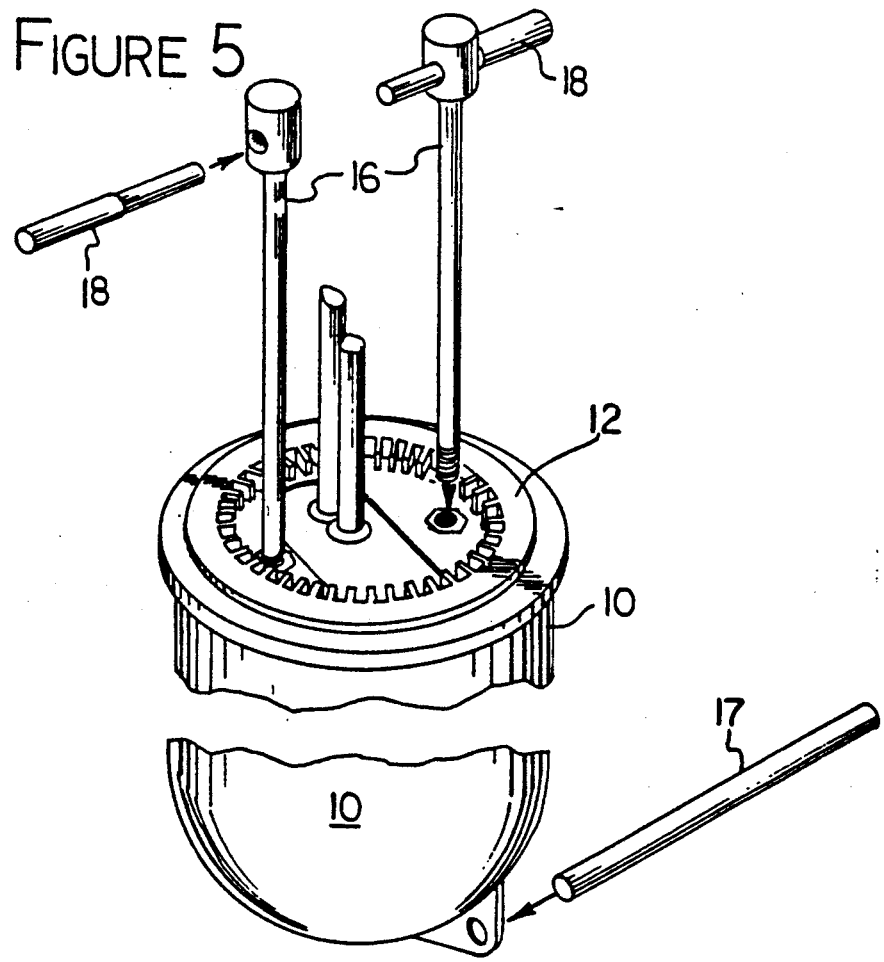

SPLICE CLOSURE WITH LIFTING HANDLES

BACKGROUND OF THE INVENTION

The field of the invention is closed canisters holding light waveguide splice trays.

When light waveguide cables must be spliced in an area which is not environmentally protected, a heavy duty canister (splice closure) is used. Although the prior art discloses such canisters with end caps at both ends for cable entry, it is now preferred to use canisters with only one end cap so that potential environmental exposure will be minimized. The canister holds a splice tray in which optical fibers from at least two different cables are spliced together.

Because water will eventually impair or terminate proper performance of light waveguide fibers, the splice tray area must be protected from contact with water. To accomplish this, the end cap area where the light waveguide cables enter the canister must be sealed from water entry. This protection may be afforded through the use of tapes, pastes, or gels.

The use of a water impermeable gel immediately inside the end cap gives an important secondary means of preventing water entry to the splicing area. One disadvantage of using a gel, however, is that such gels are messy to work with, particularly if the gel is allowed to be present in the splicing area.

AT&T's Lightguide closure employs the use of a gel immediately facing the end cap of the light waveguide canister. A wrapper is placed around the gel to keep the gel separated from the rest of the contents of the splice closure. Use of the wrapper can be inconvenient, however, and either additional sealants such as 0-rings must be used, in order to prevent water from migrating between the wrapper and the interior surface of the container.

If a waterblocking gel is used immediately inside the container end cap, the partial vacuum which results when the end cap is removed can make it difficult to remove the closure end cap.

It is believed that the state of the art would be improved if a closure could be provided which allowed the use of a waterblocking gel immediately inside the closure end cap, which could completely block the access of water but allow access of light waveguide buffer tubes to the splice tray area, yet which does not require the use of a wrapper and still allows removal of the end cap without a great deal of effort.

SUMMARY OF THE INVENTION

This improvement has been achieved by the current invention. The light waveguide splice closure according to the invention comprises a container having an end cap through which light waveguide cables may be inserted. The container holds splicing means for placing light waveguides from the cables into optical communication with each other. A unitary vessel of resilient material is placed between the end cap of the splice closure and the splicing means. This vessel holds the encapsulating waterblocking gel and has an open top with a flared resilient brim forming a seal with the interior of the container. The brim is separated from the inner surface of the end cap by distance of approximately one inch. The vessel has a closed bottom having means for light waveguides to pass therethrough to the splicing means. In the preferred embodiment, the bottom of the vessel has a series of areas of reduced thickness which can be penetrated by a light waveguide buffer tube.

The craftsperson may remove the end cap by standing on a bar passing through a hole in a flange in the container surface to immobilize the container, replacing grounding bolts in the end cap with lifting handles, and pulling on the lifting handles to remove the end cap from the container. This can be done without great difficulty because the area of contact between the encapulant and the interior of the container is limited, but still sufficient to perform the function of blocking the passage of water to the splice tray area.

BRIEF DESCRIPTION OF THE DRAWINGS

The invention will be described with reference to the drawings, in which:

FIGS. 4 and 5 are perspective views of the end cap area illustrating installation of the lifting handles and the immobilizing bars; and, FIGS. 6 and 7 are side elevations illustrating removal of the end cap by a craftsperson.

DETAILED DESCRIPTION OF THE PREFERRED EMBODIMENT

Figure 1:
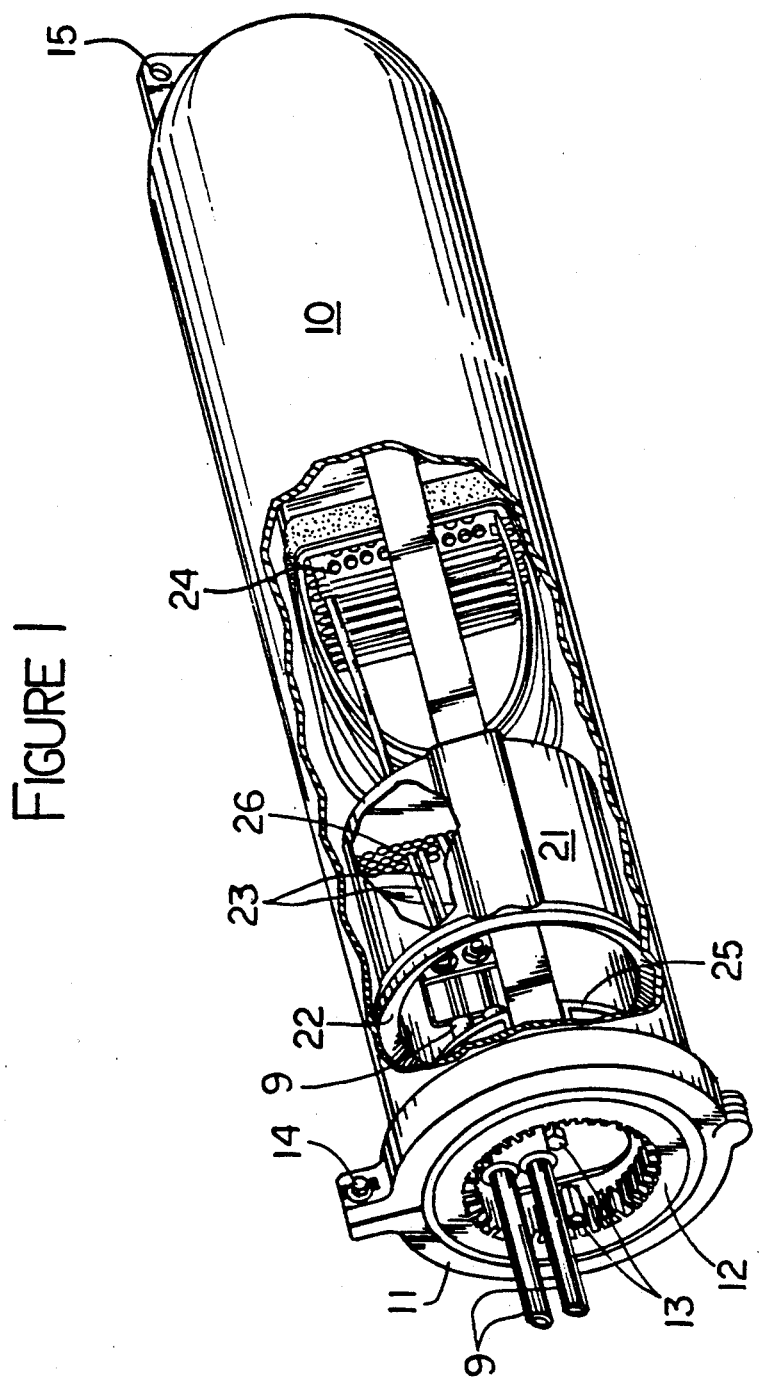
FIG. 1 is a perspective view of the splice closure with a portion of the walls of the vessel and the container removed to provide an interior view.
Figure 2:
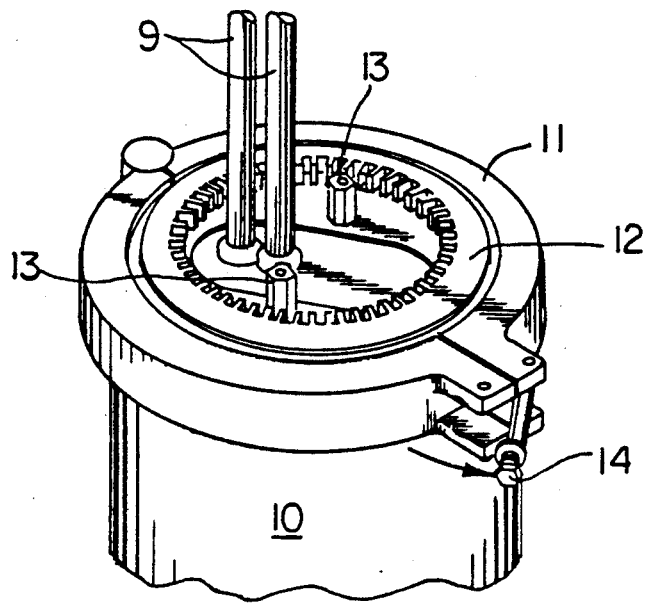
FIGS. 2 and 3 are more detailed perspective views of the end cap area showing removal of the end cap clamp.

Referring to FIG. 1, the light waveguide splice closure includes an ethylene-propylene copolymer container 10 holding a light waveguide splice tray 24. Container 10 is closed by end cap 12, which has a metallic surface 25 within container 10. Also mounted in container 10 is silicone rubber vessel 21, which is shaped in the form of a pail having an open top with a flared resilient brim 22. In use, brim 22 is in contact with the interior surface of container 10 to form a seal. Two light waveguide cables 9 enter end cap 12 through holes which have been drilled therein. Since pail 21 is between end cap 12 and splice tray 24, light waveguides in buffer tubes 23 must proceed through the closed bottom of vessel 21 in order to be spliced together in splice tray 24. This is facilitated by a series of circular areas 26 in the bottom of vessel 21 of reduced thickness. In this manner, only a minimum number of areas 26 need to be breached equal to the number of light waveguide buffer tubes 23 which must pass to splice tray 24. Brim 22 and surface 25 of end cap 12 are separated from each other by a distance of approximately one inch, which distance should preferably not exceed two inches. In actual use, vessel 21 will be filled up to surface 25 with an encapsulant which is a gel preventing access of water to splice tray 24; however, the encapsulant is omitted from the drawings in order for the interior of the splice closure to be viewed.

Splice closure entry is described with reference to FIGS. 2-7. A clamp 11 is secured around end cap 12 by means of clamp bolt 14. When bolt 14 is unscrewed, it swings outward in the direction of the arrow in FIG. 2 to allow removal of clamp 11 as shown in FIG. 3.

Figure 3:
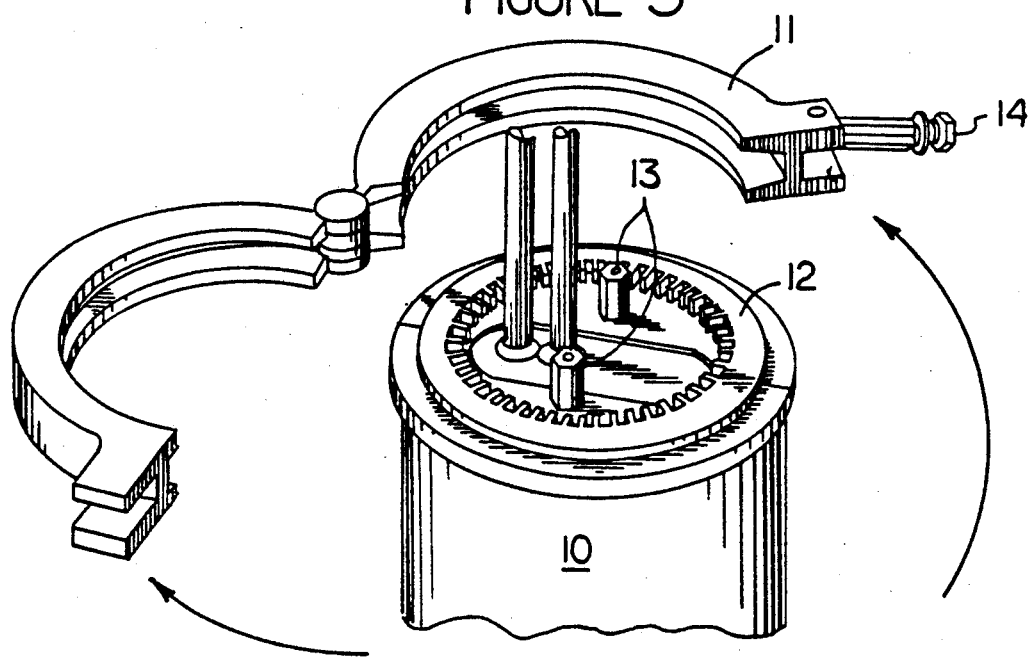
Figure 6:
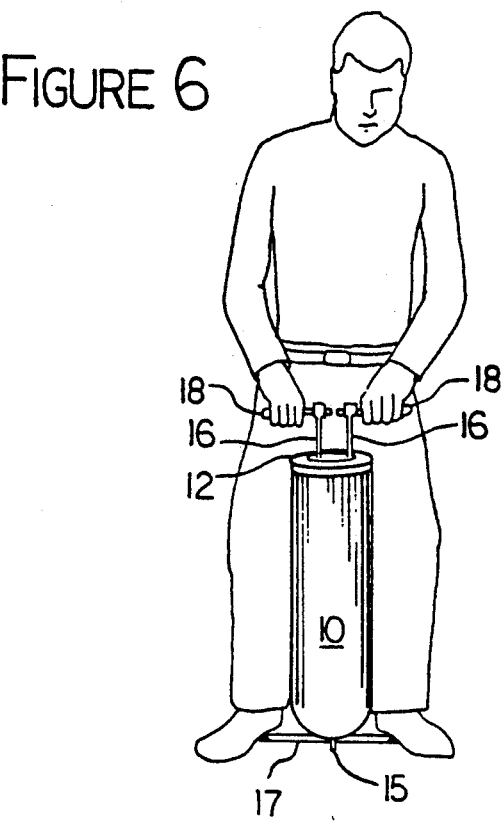
Figure 7:
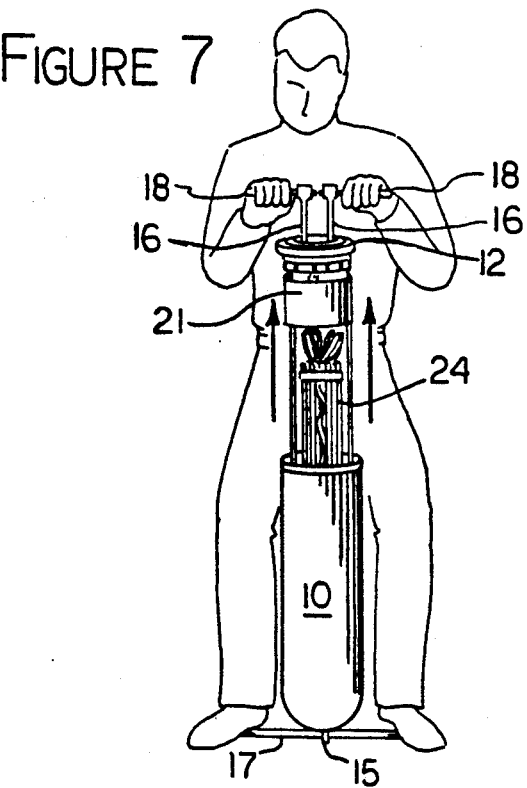

With reference to FIGS. 3 and 4, grounding bolts 13 are normally housed in threaded metallic grounding lugs 20 which are provided by the prior art in the surface of end cap 12. After bolts 13 are removed, rigid metal posts 16 are inserted into lugs 20 and lifting handles 18 are passed through posts 16. In addition, bar 17 is passed through hole 15 in a flange projecting slightly from the bottom of container 10. After bar 17 has been inserted, the craftsperson stands on bar 17 and lifts upwards on handles 18 to remove end cap 12 from the container, as shown in FIGS. 6 and 7.

The unmodified splice closure (without the pail and lifting apparatus improvements) is available from RXS Schrumpftechnick-Garnituren GmbH. The lifting posts and handles 16, 18 are rigid and can be formed from aluminum or steel. Pail 21 is resilient molded silicone rubber.

What is claimed is:

1. A method for opening a light waveguide splice closure having a container and an end cap having hollow grounding lugs, comprising: immobilizing the container, affixing lifting handles to the hollow lugs in the end cap, and pulling on the lifting handles to remove the end cap from the container.

2. A light waveguide splice closure, comprising: a container having an end cap through which light waveguides may be inserted, said container holding splicing means for placing light waveguides into optical communication with each other and a vessel located between the end cap and the splicing means for holding encapsulant, said vessel having (1) an open top having a flared resilient brim forming a seal with the interior of the container and (2) a bottom having means for light waveguides to pass therethrough to the splicing means.

3. A light waveguide splice closure as recited in claim 2 wherein the vessel is made of resilient material.

4. A light waveguide splice closure as recited in claim 2 wherein the vessel brim is separated from the end cap by a distance of approximately one inch.

5. A light waveguide splice closure as recited in claim 2, further comprising at least one handle affixed to the exterior of said end cap.

* * * * *